United States Patent [19]
Schmelzer

[11] Patent Number: 5,042,158
[45] Date of Patent: Aug. 27, 1991

[54] INCLINATION SENSOR

[75] Inventor: Robert Schmelzer, Lennestadt, Fed. Rep. of Germany

[73] Assignee: Paul Schmidt, Fed. Rep. of Germany

[21] Appl. No.: 387,334

[22] Filed: Jul. 28, 1989

[30] Foreign Application Priority Data

Sep. 29, 1988 [DE] Fed. Rep. of Germany ....... 3833062

[51] Int. Cl.⁵ .......................... G01C 9/06; G01C 9/10
[52] U.S. Cl. ........................................ 33/366; 33/391; 33/396
[58] Field of Search ................. 33/366, 391, 396, 402, 33/365, 390, 304, 313

[56] References Cited

U.S. PATENT DOCUMENTS

| | | | |
|---|---|---|---|
| 2,576,202 | 11/1951 | Wullschleger | 33/390 |
| 2,825,978 | 3/1958 | Davs | 33/366 |
| 2,893,134 | 7/1959 | Shea et al. | 33/366 |
| 3,204,233 | 8/1965 | Oliff | 33/366 |
| 3,311,990 | 4/1967 | Wright | 33/390 |
| 3,962,693 | 6/1976 | Schamblin | 33/366 |
| 4,450,353 | 5/1984 | Sjolund | 33/366 |
| 4,545,129 | 10/1985 | Stone | 33/390 |
| 4,554,535 | 11/1985 | Floris et al. | 33/366 |
| 4,794,703 | 1/1989 | Siband | 33/366 |

FOREIGN PATENT DOCUMENTS

| | | | |
|---|---|---|---|
| 0041901 | 12/1981 | European Pat. Off. . | |
| 0254188 | 1/1988 | European Pat. Off. . | |
| 849488 | 1/1952 | Fed. Rep. of Germany . | |
| 2301511 | 7/1973 | Fed. Rep. of Germany . | |
| 3308323 | 9/1984 | Fed. Rep. of Germany . | |
| 2478301 | 9/1980 | France . | |
| 0107205 | 6/1984 | Japan | 33/366 |
| 0128221 | 5/1988 | Japan | 33/366 |
| 0204111 | 8/1988 | Japan | 33/366 |
| 7703523 | 10/1978 | Netherlands | 33/366 |
| 0221329 | 7/1968 | U.S.S.R. | 33/366 |
| 0605084 | 4/1978 | U.S.S.R. | 33/366 |

Primary Examiner—Thomas B. Will
Attorney, Agent, or Firm—Toren, McGeady & Associates

[57] ABSTRACT

An inclination sensor, in particular for measuring an inclination of service lines and/or ram boring machines, comprising a pendulum arranged in a measuring cell and at least one displacement sensor measuring the deflection of the pendulum. The pendulum comprises a body moving on a circular arcuate path in the measuring cell, the length of the pendulum being the same as the radius of the path. In this way a pendulum length can be obtained that is larger than the diameter of the measuring cell so as to obtain a large deflection of the body for a given angle and thereby achieve high sensitivity and accuracy of measurement.

5 Claims, 2 Drawing Sheets

INCLINATION SENSOR

TECHNICAL FIELD OF THE INVENTION

The invention relates to an inclination sensor, in particular for measuring the angle of inclination of service lines and/or ram boring machines, comprising a pendulum arranged in a measuring cell and at least one displacement sensor measuring the deflection of the pendulum.

BACKGROUND OF THE INVENTION AND PRIOR ART

An inclination sensor of this kind is described in "Zeitschrift für Kulturtechnik und Flurbereinigung" 16, pages 296 to 303 (1975). In this inclination sensor the measuring cell includes a chamber filled with silicone oil in which the pendulum is movably suspended in the general region of the top of the chamber. On either side of the pendulum, which comprises an electrically conductive, ferromagnetic or permanently magnetic material, an inductive displacement sensor is arranged at an angle to the longitudinal axis of the inclination sensor which substantially corresponds to the maximum angular deflection of the pendulum. The measuring cell is suspended to be easily rotatable in the housing of the inclination sensor, since the pendulum and its point of suspension must always be in the vertical middle longitudinal plane of the measuring cell irrespective of the position of the sensor housing, so that it can rotate about its own axis while moving forward in a pipe line.

In this arrangement the pendulum always stays in its vertical position irrespective of the angular position assumed by the sensor. When the sensor is inclined relative to the pendulum the distance of the pendulum from one of the inductive displacement sensors is therefore reduced, while its distance from the other sensor is increased. This change in distance is a measure of the angular position of the sensor and can be displayed and/or recorded.

The demands on this sensor in respect of the sensitivity and accuracy with which the inductive sensors measure the deflection of the pendulum are very great, as the length of the pendulum can only be very small and the deflection of the pendulum relative to the inductive sensors is proportional to the angle and to the length of the pendulum. Thus with the known sensors, despite a relatively high outlay in apparatus, only relatively low accuracy of measurement can be achieved.

OBJECT OF THE INVENTION

Based on the consideration that the linear deflection of the pendulum is larger the longer the pendulum length is, it is an object of the invention to obtain an adequate length of pendulum in an inclination sensor of the kind described in the introduction without increasing the outlay in apparatus, and as a result to achieve an increase in the sensitivity and accuracy of the measurement.

SUMMARY OF THE INVENTION

The invention is based on the idea of using a pendulum having a fictitious length instead of one with a real length.

According to the invention, in a sensor of the kind described in the introduction the pendulum consists of a measuring body moving in the measuring cell on a path curved as an arc of a circle and the length of the pendulum corresponds to the radius of the path.

The measuring body can slide, or preferably roll, on the circular arcuate path and can then advantageously consist of a ball which is arranged to move freely in a barrel-shaped region of the measuring cell consisting of a section of pipe or tube. The radius of the vault of the barrel-shaped region then corresponds to the length of the pendulum which can almost be any length. Since the radius of the vault of the barrel-shaped region is almost independent of the size of the measuring cell a radius can be selected which is in any case considerably larger than the diameter of the measuring cell, so that even a small angular deflection of the sensor leads to a large deflection of the ball, which in turn results in a large change in the measured value. Since the contour of the barrel-shaped region in the measuring cell is rotationally symmetrical in relation to the longitudinal axis of the measuring cell and the inductive displacement sensors are preferably arranged in the longitudinal axis of the measuring cell, rotation of the sensor about its longitudinal axis has no influence whatsoever on the measurement result. If, for example, the sensor according to the invention is used in association with a ram boring machine, the ram boring machine can, when advancing, rotate without further ado about its longitudinal axis without the measurement result being falsified thereby.

So that the displacement sensor can respond to displacement of the measuring ball it consists of an electrically conductive, ferromagnetic or permanently magnetic material.

In order to prevent the blows resulting from the operation of the ram boring machine from affecting the measurement results, the measuring cell can be filled with a liquid, preferably with oil, for example silicone oil, whose viscosity only changes slightly with the temperature.

A usable measuring cell which meets the demands in respect of sensitivity of measurement and accuracy results if the diameter of the ball is about the same as the radius of the largest diameter of the barrel-shaped region, if the axial length of the barrel-shaped region corresponds to about twice the diameter of the ball and if cylindrical bores, in which the inductive displacement sensors are arranged, adjoin the ends of the barrel-shaped region.

BRIEF DESCRIPTION OF THE DRAWINGS

The invention will now be explained in more detail with reference to an exemplary embodiment shown in the drawings, in which.

DETAILED DESCRIPTION OF A PREFERRED EMBODIMENT OF THE INVENTION

Figure 1:
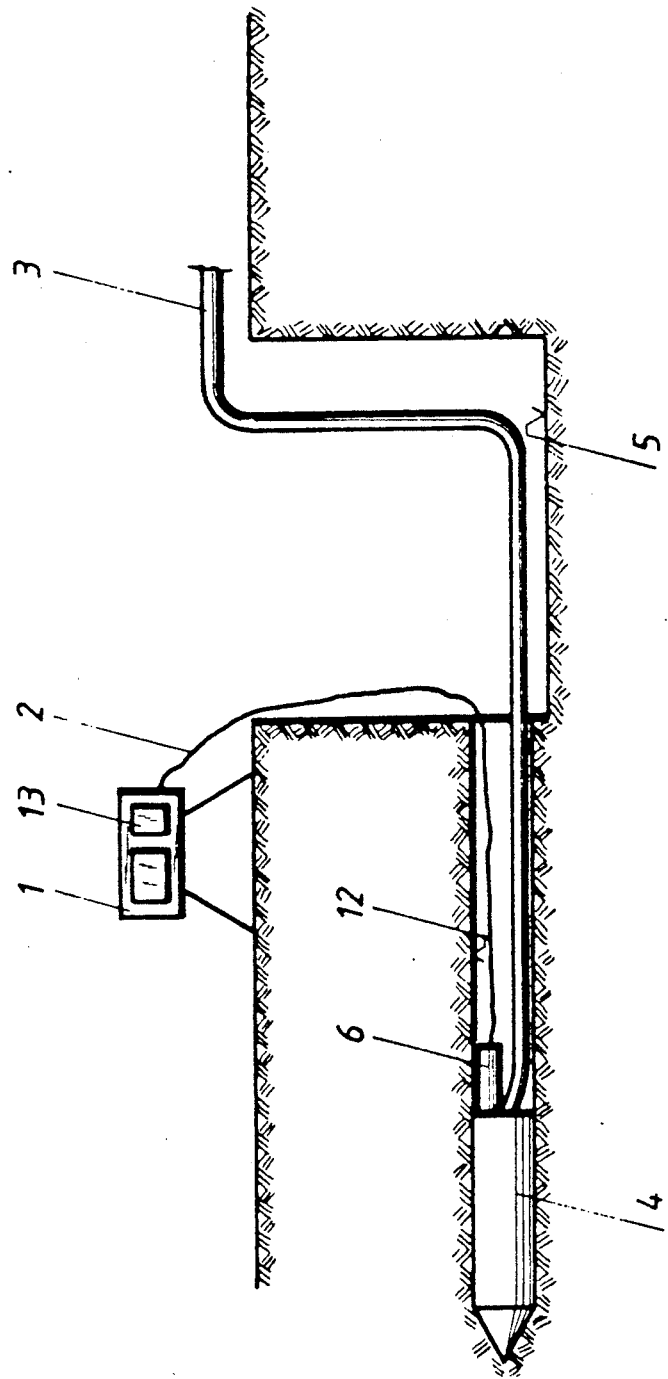
FIG. 1 shows a diagrammatic view of a ram boring machine in a passage in the ground, with sensors arranged thereon.
Figure 2:
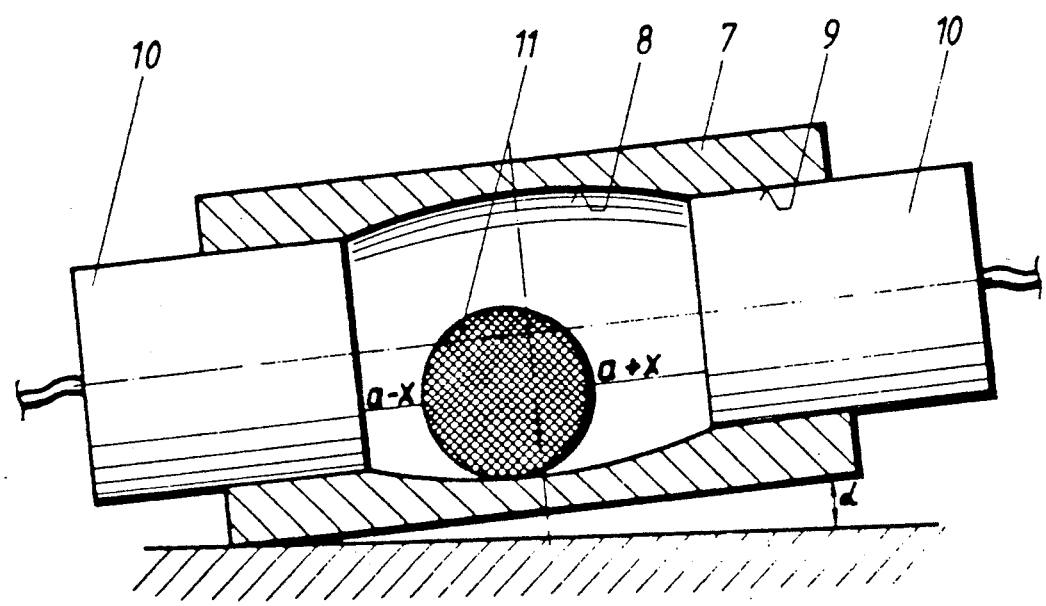
FIG. 2 shows a diagrammatic section through an measuring cell of the sensor.

A visual display and measurement recording device 1 is connected via a cable 2 to an inclination sensor 6, which in turn is attached to a ram boring machine 4. This ram boring machine 4 is driven by compressed air supplied via a compressed air hose 3 and produces a passage 12 in the ground starting from an excavation 5.

By means of the sensor 6 and the visual display and recording device 1 the angular position of the ram boring machine 4 relative to the horizontal can be monitored continuously and a deviation from the intended boring direction can be corrected.

The core of the sensor 6 is a measuring cell 7 comprising a section of pipe having a barrel-shaped region 8 and cylindrical bores 9 adjacent thereto and extending in the axial direction. A measuring ball 11 is arranged in the barrel-shaped region. A displacement of the ball 11 caused by an angle of inclination $\alpha$ of the measuring cell 7 is measured by the inductive displacement sensors 10 arranged in the cylindrical bores 9 on either side of the measuring ball 11. This displacement, which is given by $a-x$ relative to the inductive displacement sensor on the left and $a+x$ relative to the inductive displacement sensor 10 on the right, effects a change in the magnetic induction of the displacement sensor ball system and thus the electrical properties of the inductive displacement sensor 10. The difference between the electrical properties of the two inductive displacement sensors 10 is recorded with a carrier frequency measuring amplifier 13; it gives an indication in the visual display and recording device 1 which is a function of the angle of inclination of the measuring cell, and thus of the ram boring machine 4, in the bore 12.

As the radius of the vault of the barrel-shaped region 8 can be larger than the diameter of the measuring cell 7 a long pendulum length results and thus a large displacement of the ball 11 for a given angle $\alpha$ and a large measurement signal derived therefrom, which leads to a clear and accurate indication.

The sensitivity of the sensor 6 to impact can be reduced by filling the barrel-shaped region 8 with silicone oil.

The ball 11 can consist of electrically conductive, ferromagnetic or permanently magnetic material if inductive displacement sensors 10 are used. Capacitive displacement sensors which react to a change in an electrostatic field caused by the displacement of the ball 11 are however also appropriate.

What is claimed is:

1. An inclination sensor, in particular for measuring the angle of inclination from the horizontal of service lines and/or ram boring machines, comprising a pendulum arranged in a measuring cell, and at least one displacement sensor for measuring deflection of the pendulum, the pendulum being formed of a measuring body moving in the measuring cell along a circular arcuate path, the measuring cell comprising a tubular section having a barrel-shaped region, and the pendulum comprising a freely moving ball, the length of the pendulum corresponding to the radius of the vault of the barrel-shaped region, said ball having a diameter about the same as the radius of the largest diameter of the barrel-shaped region, the barrel-shaped region having an axial length corresponding to approximately twice the diameter of the ball and at least one cylindrical bore in which said at least one sensor is arranged being provided adjacent to the barrel-shaped region.

2. A sensor according to claim 1 wherein said measuring body is comprised of an electrically conductive material and said at least one sensor is an inductive displacement sensor.

3. A sensor according to claim 1 wherein said measuring body is comprised of a ferromagnetic material.

4. A sensor according to claim 1 wherein said measuring body is comprised of a permanently magnetic material.

5. A sensor according to claim 1 wherein said measuring cell is filled with a liquid.

* * * * *